(12) United States Patent
Dollard

(10) Patent No.: US 6,377,642 B1
(45) Date of Patent: Apr. 23, 2002

(54) SYSTEM FOR CLOCK RECOVERY

(75) Inventor: Michael S. Dollard, Brecksville, OH (US)

(73) Assignee: Cisco Technologies, Inc., San Jose, CA (US)

( * ) Notice: Subject to any disclaimer, the term of this patent is extended or adjusted under 35 U.S.C. 154(b) by 0 days.

(21) Appl. No.: 09/267,923

(22) Filed: Feb. 26, 1999

(51) Int. Cl.[7] .............................. H04L 7/00; H04L 27/06
(52) U.S. Cl. ..................... 375/355; 375/354; 375/344; 375/371
(58) Field of Search ................................. 375/355, 371, 375/326, 327, 359, 360, 354, 344

(56) References Cited

U.S. PATENT DOCUMENTS

| | | | |
|---|---|---|---|
| 4,411,000 A | 10/1983 | Kustka | 375/11 |
| 4,550,415 A | 10/1985 | Debus, Jr. et al. | 375/14 |
| 4,969,163 A | 11/1990 | Ungerboeck | 375/14 |
| 5,095,495 A | 3/1992 | Golden | 375/14 |
| 5,247,544 A | 9/1993 | LaRosa et al. | 375/118 |
| 5,283,811 A | 2/1994 | Chennakeshu et al. | 375/14 |
| 5,377,226 A | 12/1994 | Davis | 375/1 |
| 5,594,758 A * | 1/1997 | Petranovich | 375/344 |
| 5,602,872 A | 2/1997 | Andrews | 375/234 |
| 5,654,987 A | 8/1997 | Nakamura | 375/355 |
| 5,671,257 A | 9/1997 | Cochran et al. | 375/355 |
| 5,692,010 A | 11/1997 | Nielsen | 375/232 |
| 5,703,914 A * | 12/1997 | Nakamura | 375/355 |
| 5,732,112 A | 3/1998 | Langberg | 375/349 |
| 5,777,910 A | 7/1998 | Lu | 364/724.2 |

OTHER PUBLICATIONS

Sollenerger N R et al., "Low–Overhead Symbol Timing and Carrier Recovery for TDMA Portable Radio Systems"; IEEE Transactions on Communications; vol. 38, No. 10, Oct. 1, 1990 pp. 1886–1892, XP000176877.

Benvenuto N et al., "Performance of Digital Dect Radio Links Based on Semianalytical Methods"; IEEE Journal on Selected areas in Communications, US, IEEE Inc. NY vol. No. 4, May 1, pp. 667–676.

* cited by examiner

Primary Examiner—Chi Pham
Assistant Examiner—Dung X. Nguyen
(74) Attorney, Agent, or Firm—Arter & Hadden LLP

(57) ABSTRACT

A decoding system having a clock recovery system for maintaining the optimum time for sampling a signal. The clock recovery system is particularly useful in decoding 1 Mbps signals for two-level Gaussian frequency shift key (GFSK) modulation and 2 Mbps signals for four-level Gaussian frequency shift key (GFSK) modulation. The clock recovery system remains reliable with temperature variations, and maintains a stable frequency independent of data pattern.

16 Claims, 4 Drawing Sheets

SYSTEM FOR CLOCK RECOVERY

FIELD OF THE INVENTION

The present invention generally relates to a system for accurately decoding data, and more particularly to clock recovery system for maintaining the optimum time for sampling a signal.

BACKGROUND OF THE INVENTION

Communications technology has been advancing at a very fast pace in recent years. One such area of communications technology that has seen rapid development and implementation has been wireless communications, such as wireless local area networks (LANs) and metropolitan area networks. For wireless local area networks (LANs) and metropolitan area networks, two modulation techniques have come into widespread use, namely, direct sequence spread spectrum (DSSS) and frequency-hopping spread spectrum (FHSS). The physical layer specification (PHY) for DSSS and FHSS are defined by IEEE standard 802.11, which specifies the medium access control (MAC) and physical characteristics for wireless local area networks (LANs).

In accordance with IEEE standard 802.11 (which is fully incorporated herein by reference), the DSSS system provides a wireless LAN with both a 1 Mbps and a 2 Mbps data rate communication capability. The DSSS system uses modulations of differential binary phase shift keying (DBPSK) and differential quadrature phase shift keying (DQPSK) to provide the 1 and 2 Mbps data rates, respectively. In accordance with IEEE standard 802.11, the FHSS system also provides a wireless LAN with both 1 Mbps and a 2 Mbps data rate communication capability. However, the FHSS system uses two-level Gaussian frequency shift key (GFSK) modulation for 1 Mbps data rates, and four-level Gaussian frequency shift key (GFSK) modulation for 2 Mbps data rates. Thus, in two-level GFSK (2GFSK) the incoming bit stream is converted to 1 bit words or symbols (0, 1), and in four-level GFSK (4GFSK) the incoming bit stream is converted to 2 bit words or symbols (00, 01, 11, 10). It should be appreciated that for 4GFSK the 2 bit symbols are Gray code (i.e., adjacent symbol levels only differ in only one bit), in order to minimize errors.

A typical wireless communications system generally operates as follows. A transmitting device encodes a symbol as an analog signal. This analog signal is then upconverted in frequency to be transmitted to a receiving device via a wireless medium. The receiving device downconverts the analog signal to a lower frequency, passes it through a limiter and discriminator circuit to remove the FM modulation. The resulting waveform is converted into digital values using an analog-to-digital converter (ADC). The digital values form an input waveform that is decoded to recover the symbols originating from the transmitting device. In order to properly decode the input waveform, the input waveform must be sampled during an appropriate interval. In this regard, the input waveform is preferably sampled at a time when the input waveform is at maximum separation from an input waveform for the nearest (or adjacent) symbol. Distinguishing between input waveforms for adjacent symbols is made difficult due to fading, signal dropout, noise and interference, which are commonplace in signals transmitted via a wireless medium. Problems are also encountered as a result of oscillator drift.

In the prior art a phase-locked loop (PLL) is frequently utilized to decode waveforms such as those described above. A PLL includes a phase detector, amplifier, and voltage controlled oscillator (VCO). The phase detector compares two input frequencies ($f_{IN}$ of the input signal and $f_{VCO}$ of the VCO), generating a phase-error signal that is a measure of their phase difference. The phase-error signal is filtered and input to the amplifier to generate a control voltage. For example, the phase-error signal may be a periodic output at the difference frequency. If $f_{IN}$ does not equal $f_{VCO}$, the phase-error signal, after being filtered and amplified, causes the VCO frequency ($f_{VCO}$) to deviate in the direction of $f_{IN}$. If conditions are right, the VCO will quickly "lock" to $f_{IN}$, maintaining a fixed phase relationship with the input signal. As a result, the filtered output of the phase detector is a dc signal, and the control voltage input to the VCO is a measure of the input frequency $f_{IN}$. However, the PLL has several drawbacks, including frequency drift with temperature variations and frequency variations during long runs of the same bit pattern.

The present invention addresses these and other decoding problems encountered in the prior art, to provide a system for clock recovery.

SUMMARY OF THE INVENTION

According to the present invention there is provided a decoding system for decoding a received input waveform including a plurality of encoded symbols, the decoding system comprising: sampling means for sampling an input waveform for a plurality of sample cycles, wherein for each sample cycle a zero-crossing input value is obtained at a first sampling time and a sampled input value is obtained at a second sampling time; decoding means for decoding each sampled input value into a decoded symbol; symbol evaluation means for comparing the decoded symbol from a current sample cycle to the decoded symbol from a previous sample cycle; means for determining an accumulated offset value, in accordance with the character of the transition between the decoded symbol from a current sample cycle to the decoded symbol from a previous sample cycle; and timing modification means for modifying one of said first and second sampling time of at least one sample cycle in response to said accumulated offset value exceeding at least one predetermined threshold value.

According to another aspect of the present invention there is provided a method for decoding a received input waveform including a plurality of encoded symbols, the method comprising: sampling an input waveform for a plurality of sample cycles, wherein for each sample cycle a zero-crossing input value is obtained at a first sampling time and a sampled input value is obtained at a second sampling time; decoding each sampled input value into a decoded symbol; comparing the decoded symbol from a current sample cycle to the decoded symbol from a previous sample cycle; determining an accumulated offset value, in accordance with the character of the transition between the decoded symbol from a current sample cycle to the decoded symbol from a previous sample cycle; and modifying one of said first and second sampling times of at least one sample cycle in response to said accumulated offset value exceeding at least one predetermined threshold value.

An advantage of the present invention is the provision of a clock recovery system which is stable with temperature variations and maintains a stable frequency independent of data pattern.

Another advantage of the present invention is the provision of a clock recovery system which minimizes power consumption;

Still another advantage of the present invention is the provision of a clock recovery system which is inexpensive to manufacture;

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

It should be appreciated that while the present invention will be described with reference to two-level Gaussian frequency shift key (GFSK) modulation for 1 Mbps input waveformns, and four-level Gaussian frequency shift key (GFSK) modulation for 2 Mbps input waveforms, the present invention is also suitable for use in connection with other modulation techniques having similar characteristics.

Figure 1:
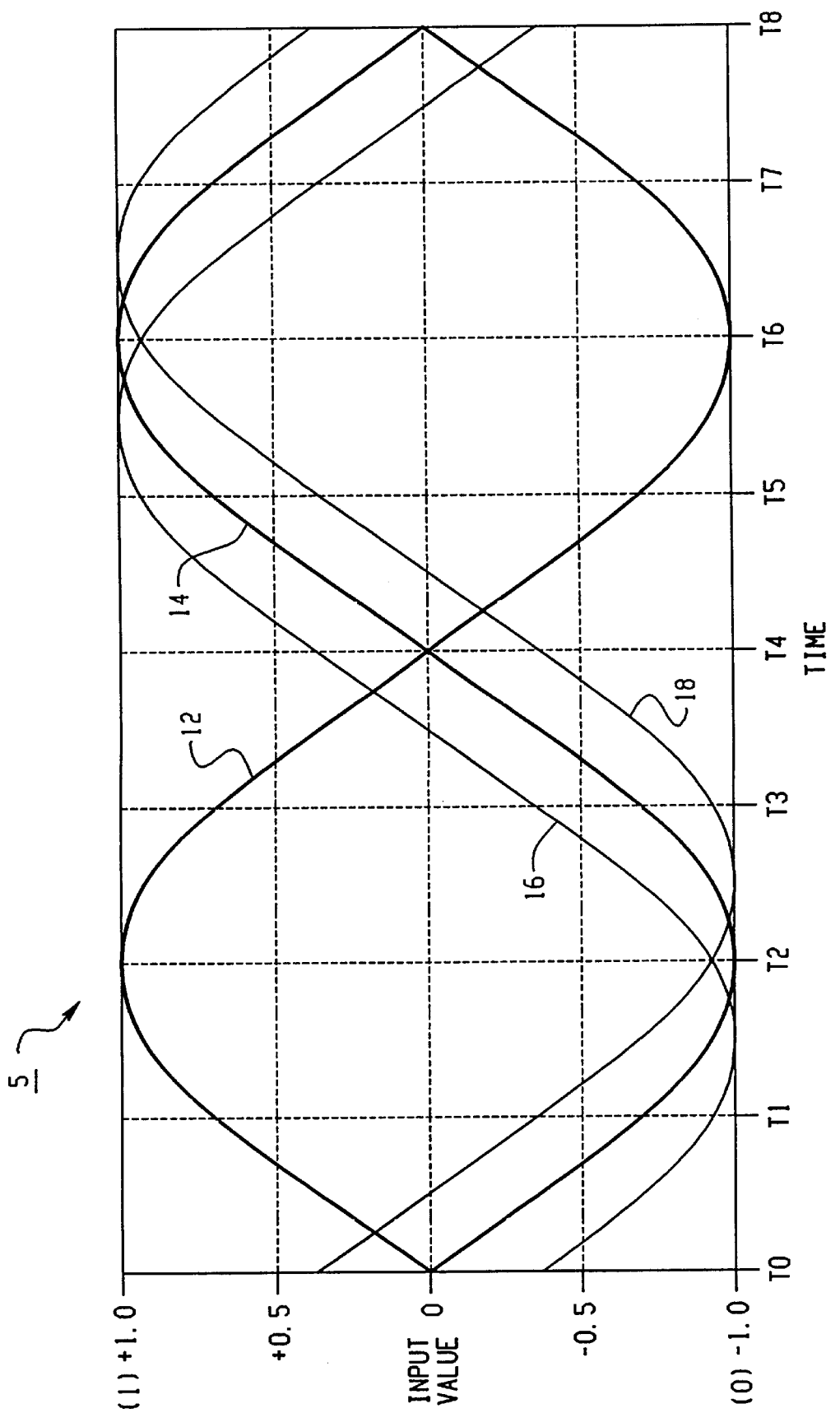
FIG. 1 is an eye diagram for a 2-level Gaussian frequency shift key signal.

Referring now to the drawings wherein the showings are for the purposes of illustrating a preferred embodiment of the invention only and not for purposes of limiting same, FIG. 1 shows an ideal 2GFSK "eye" diagram 5 at 1 Mbps. Times T0–T8 represent the times when a reference clock pulse is generated. One symbol is decoded during the time period defmed by times T0–T4 (i.e., first symbol period), while a second symbol is decoded during the time period defined by times T4–T8 (i.e., second symbol period). As indicated above, an analog signal is converted to digital values, which form an input waveform of varying input values. The input waveform is decoded to recover the symbols originating from a transmitting device. FIG. 1 illustrates the two possible transitions from symbol '1' to symbol '0' (waveform 12), and from symbol '0' to symbol '1' (waveform 14). In addition, "offset" input waveforms 16 and 18 are also shown. Waveform 16 is a "retarded" waveform (i.e., crosses zero early), whereas waveform 18 is an advanced waveform (i.e., crosses zero later).

In eye diagram 5, the input values ranging from −1 to +1. As also discussed above, in order to properly decode the input waveform into the corresponding symbol, the input waveform must be sampled during an appropriate interval. Preferably, the input waveform is sampled when the "eye" diagram is at or near its maximum opening. This is particularly important when the input waveforms are not "ideal" (i.e., effected by filtering, phase distortions, signal dropout, noise and/or interference). The maximum opening for input waveforms 12 and 14 occurs at times T2 and T6.

One objective of the present invention is to maintain the optimum time to sample the input waveform to decode the symbols encoded therein. As mentioned above, the optimum sample time for decoding occurs where maximum separation of symbol levels occur or equivalently, the time when the eye diagram is open the widest. The optimum time to sample input waveforms 12 and 14 would be at times T2 and T6, since this is where the input waveform has the maximum separation between levels for an encoded symbol '1' and an encoded symbol '0.' However, times T2 and T6 would not be the optimum sample times to sample "offset" input waveforms 16 and 18. Accordingly, the decoding system must modify the sample time for decoding, to get as close to the maximum separation between the levels for an encoded symbol '1' and an encoded symbol '0.'

The decoding system determines when the input waveform crosses the zero level, i.e., transitions from a positive value to a negative value or vice versa. If the input waveform is "ideal" then the zero crossing should occur at times T0, T4 and T8, and have an input value at or near zero. However, if the input waveform is advanced (e.g., input waveform 18), then times T0, T4, and T8 will be too early. Consequently, the input value sampled at times T0, T4 and T8 will not be zero. Instead, the input value will be a negative value when the input waveform transitions from a symbol '0' to a symbol '1' (see time T4) and a positive value when the input waveform transitions from a symbol '1' to a symbol '0' (see time T0 and time T8). A similar phenomenon occurs if the input waveform is retarded (e.g., input waveform 16). In this case, the input value will be a positive value when the input waveform transitions from a symbol '0' to a symbol '1' (see time T4), and a negative value when the input waveform transitions from a symbol '1' to a symbol '0' (see time T0 and time T8). It should be understood that the more retarded or advanced the waveform is (i.e., the greater the offset), the larger the "error" becomes when the input waveform is sampled at the time of the "ideal" zero crossing (e.g., times T0, T4 and T8).

The present invention utilizes the foregoing information to optimize the time for generating a decode sample pulse for decoding the input waveform. The decode sample pulse acts as a trigger for sampling the input waveform and decoding the symbol encoded therein, based upon the resultant input value. A zero crossing pulse acts as a trigger for sampling the input waveform to obtain a respective input value, which should be at or relatively near to zero.

In the embodiment illustrated in FIG. 1, there are four decode sample times per symbol. In this regard, a decode sample pulse may be generated at times T1, T2, and T3 to decode the first symbol, and a decode sample pulse may be generated at times T5, T6, and T7 to decode the next consecutive symbol. (With reference to input waveforms 12 and 14). However, the "optimum" time for generating a decode sample pulse is at T2 and T5 (maximum opening), which is two sample times (i.e., reference clock pulses) after a zero crossing pulse has occurred (e.g., at T0 and T4). The time between the sample pulse and the zero crossing pulse remains constant.

In view of the foregoing, the "optimum" time for generating a decode sample pulse to decode the first symbol, occurs at time T2, which is two sample times (i.e., two reference clock pulses) after a zero crossing pulse has occurred at time T0. Similarly, the "optimum" time for generating a decode sample pulse to decode the second symbol, occurs at time T6, which is also two sample times (i.e., two reference clock pulses) after a zero crossing pulse has occurred at time T4.

At the occurrence of each zero crossing pulse (e.g., times T0, T4 and T8), the respective sampled input value is stored. It is then determined whether a zero crossing occurred, and if so whether the transition was from a symbol '0' to a symbol '1' or from a symbol '1' to a symbol '0.' If a zero crossing occurred, the stored input value is either ADDED to or SUBTRACTED from an accumulator, depending upon the nature of the transition. In this regard, the stored input value is ADDED if the zero crossing is determined to be a transition from a symbol '0' to a symbol '1', and the stored value is SUBTRACTED if the zero crossing is determined to be a transition from a symbol '1' to a symbol '0'. This running sum accumulated in the accumulator indicates whether time for generating the decode sample pulse for decoding the input waveform occurs too early or too late. When the accumulated sum exceeds a programmable threshold, the time for generating the decode sample pulse is modified. Likewise, the time for generating the zero crossing pulse is also modified since the timing relationship between the decode sample pulse and the zero crossing pulse remains generally constant. If the accumulated sum is positive the next decode sample pulse occurs one reference clock pulse earlier (e.g., one 16 MHz reference clock pulse is dropped). If the accumulated sum is negative the next decode sample pulse occurs one reference clock pulse later (e.g., one 16 MHz reference clock pulse is inserted). In addition, the accumulator is then reset to zero, and the foregoing process is repeated for subsequent input waveforms.

Presume for example that the input waveform is input waveform 18, and the zero crossing pulse is initially selected to occur at time T4. In this case, time T4 is too early, and the respective input value obtained at T4 will be a negative value (i.e., approximately −0.4). Two reference clock pulses later (i.e., at time T6), a decode sample pulse is generated to obtain an input value for decoding the next encoded symbol. At sample time T6 it is determined that a symbol '0' to a symbol '1' transition has occurred. Accordingly, the value obtained at time T4 is ADDED to any value already stored in the accumulator, and the result stored therein. At time T8 another zero crossing pulse is generated to obtain an input value. In this case, the input value would be a positive value (i.e., approximately +0.4). At time T10 (not shown) it is determined that a symbol '1' to a symbol '0' transition has occurred. Accordingly, the value obtained at time T8 is SUBTRACTED from the value stored in the accumulator and the result stored therein.

As the foregoing process continues, the value accumulated in the accumulator continues to become more negative until a "negative" threshold is exceeded. When the negative threshold is exceeded, the time for generating the next decode sample pulse is advanced, so that it will occur later (i.e., after an increased number of reference clock pulses). Likewise, the time for generating the zero crossing pulse is also advanced since the timing relationship between the decode sample pulse and the zero crossing pulse remains generally constant. In addition, the accumulator is reset to zero. Likewise, if the accumulator exceeds a "positive" threshold the time for generating the next decode sample pulse is retarded, so that it will occur sooner (i.e., after a decreased number of reference clock pulses).

Figure 2:
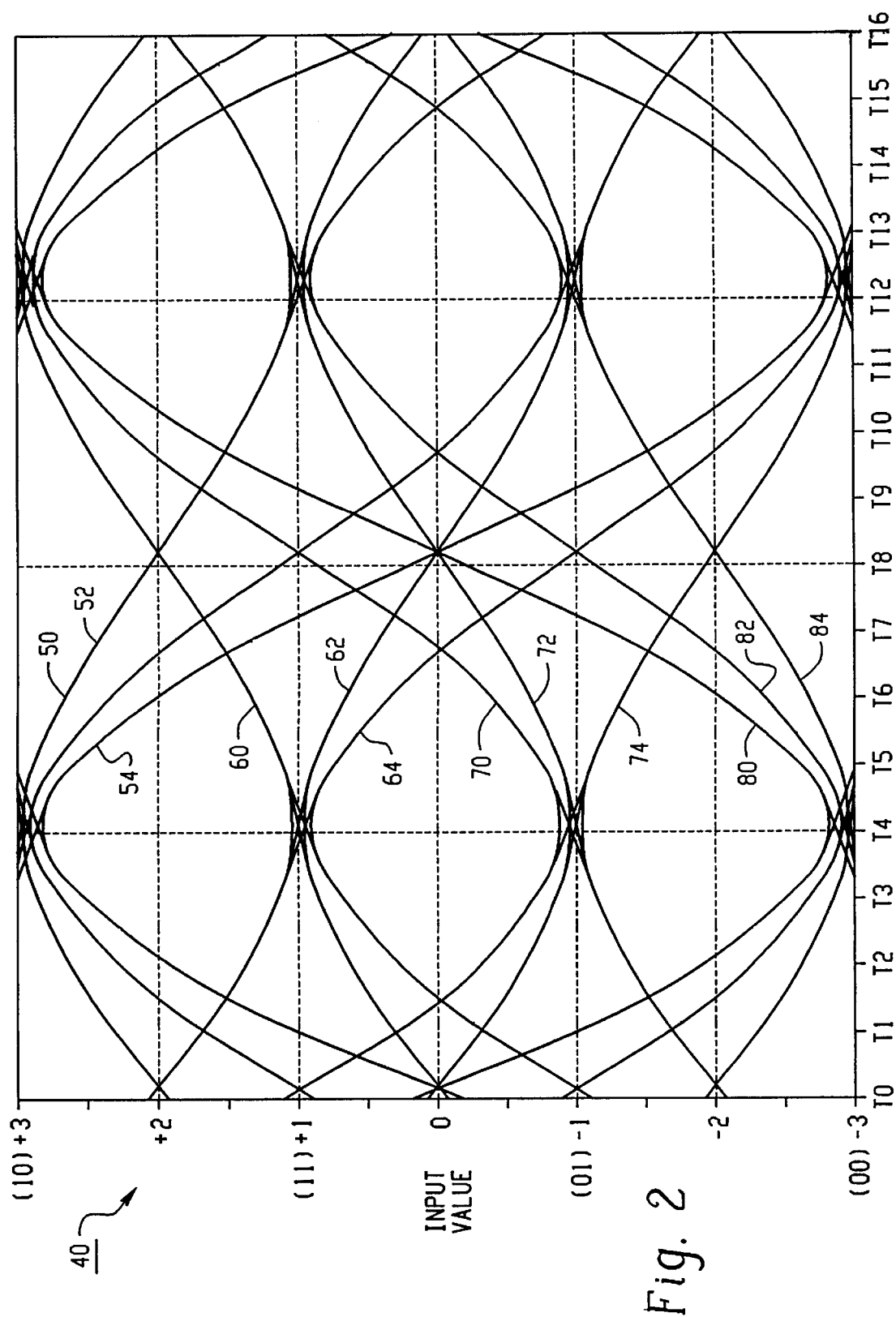
FIG. 2 is an eye diagram for a 4-level Gaussian frequency shift key signal.

The present invention will now be described in further detail as applied to a 2 Mbps signal. Turning to FIG. 2, there is shown an ideal 4GFSK "eye" diagram 40 at 2 Mbps. 4GFSK has 4 levels, each level representing a symbol consisting of a bit pair (i.e., '00' '01' '11' and '10'). Twelve (12) different input waveforms are shown for each possible symbol transition. Input waveforms 50, 52 and 54 respectively illustrate the transition from symbol '10' to symbol '11' '01' and '00'. Input waveforms 60, 62 and 66 respectively illustrate the transition from symbol '11' to symbol '10' '01' and '00' Input waveforms 70, 72 and 74 respectively illustrate the transition from symbol '01' to symbol pairs '10' '11' and '00.' Input waveforms 80, 82 and 84 respectively illustrate the transition from symbol '00' to symbol '10' '11' and '01.'

In the case of the 1 Mbps signal described above, each transition between symbols (i.e., '0' to '1' and '1' to '0') provided a zero crossing which could be used to correct the sample timing. However, in the case of the 2 Mbps signal, not all of the symbol transitions provide a readily usable zero crossing for correcting the sample timing. As can be seen from FIG. 2, not all of the input waveforms have a zero crossing at time T8. In this regard, input waveforms 50, 52, 60, 64, 70, 74, 82 and 84 do not have zero crossings at time T8. In fact, input waveforms 50, 60, 74 and 84 never cross zero.

Moreover, when consecutive symbols are the same (i.e., unchanged), the input waveform will be a generally horizontal line, and thus there will be no zero crossing.

As discussed above, the only input waveforms having a zero crossing at time T8 are input waveforms 54, 62, 72, and 80, which are the input waveforms for transitions between symbols '00' and '10', and between '10' and '11.' It is only these input waveforms that will be utilized to modify the timing of the decode sample pulse and zero crossing pulse.

Figure 3:
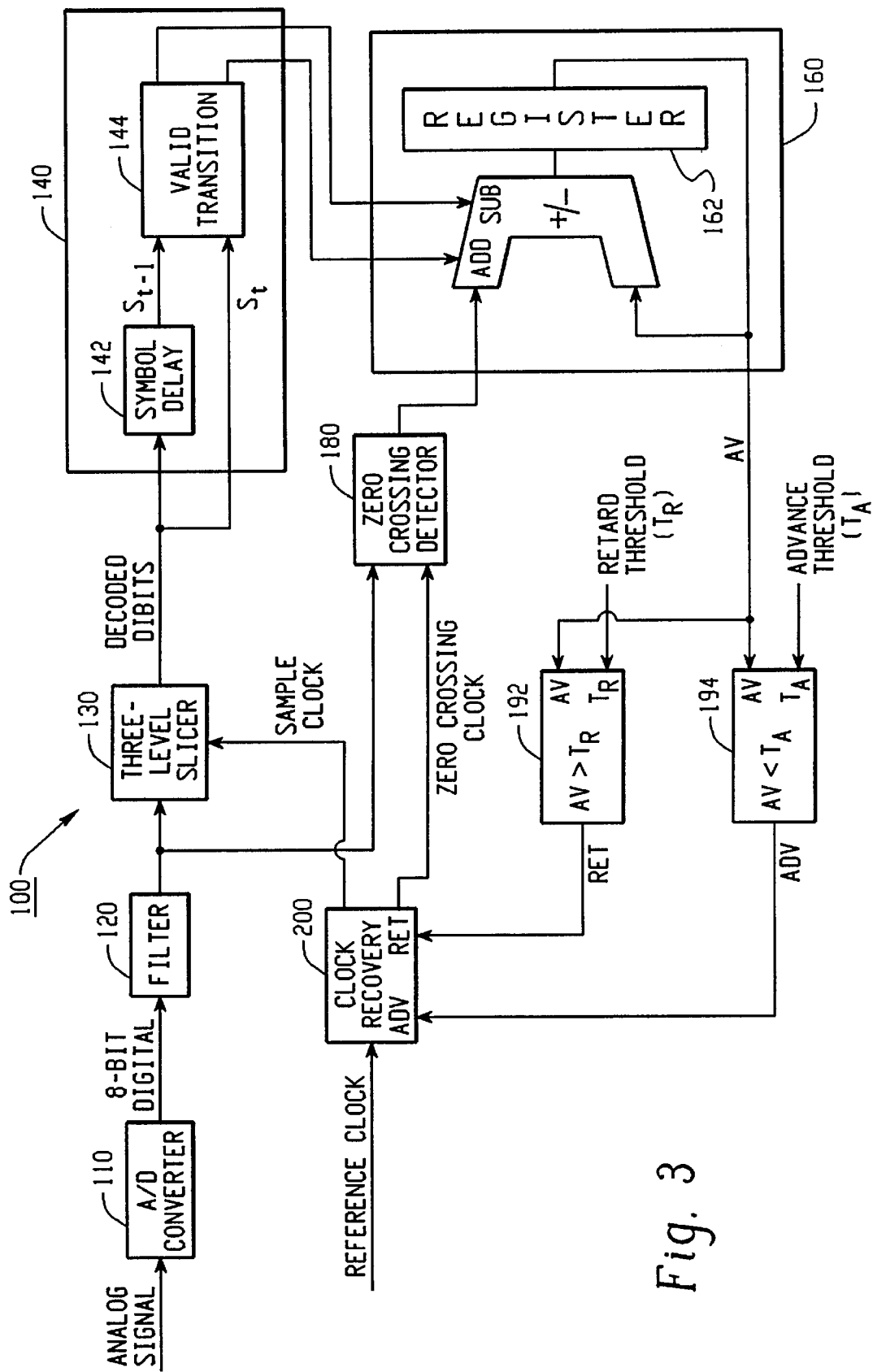
FIG. 3 is a block diagram of a decoding system according to a preferred embodiment of the present invention.

A decoding system 100 will now be described in detail with reference to FIG. 3. It should be appreciated that decoding system 100 may be used to decode either 1 Mbps or 2 Mbps data, as will be discussed below; however, the present invention is also applicable to decoding of other similar waveforms. Moreover, it should be appreciated that the circuit illustrated in FIG. 3 is solely for the purpose of illustrating a preferred embodiment of the present invention; accordingly other suitable circuit elements may be used to implement decoding system 100, including a microprocessing unit. Decoding system 100 is generally comprised of an analog-to-digital converter (A/D) 110, a filter 120, a 3-level slicer 130, a symbol evaluation circuit 140, an accumulator 160, a zero crossing detector circuit 180, comparators 192 and 194, and a clock recovery circuit 200.

A/D converter 110 converts an analog signal into an 8-bit digital value. Filter 120 filters the digital value, and outputs filtered digital data (i.e., input values) to slicer 130. Slicer 130 evaluates the input values and determines which symbol was received, as will be described in fuirther detail below. Slicer 130 is a 3-level slicer having three programmable registers (SLICE_LOW, SLICE_MID, and SLICE_HIGH). In the case of 1 Mbps data only one slice level is needed (e.g., SLICE_MID). This slice point is preferably set to around zero. In the 2 Mbps mode, slicer 130 uses all three slice levels: (1) midpoint (preferably set to around zero), (2) low point (preferably set around −2), and (3) high point (preferably set around +2). Therefore, all three programmable registers are used in the 2 Mbps mode. Slicer 130 evaluates the input values in view of the slice level(s) and outputs a decoded symbol. In the case of the 1 Mbps mode, the decoded symbol will be a '1' or a '0' (i.e., 1 bit), whereas in the case of the 2 Mbps mode, the decoded symbol will be a '00' '01' '11' or '10' (i.e., 2-bit pair).

The decoded symbols are input to symbol evaluation circuit 140. Symbol evaluation circuit 140 is generally comprised of a symbol delay register 142 and a valid transition detector 144. Symbol delay register 142 stores the decoded symbol from the previous decoding cycle ($S_{t-1}$). Valid transition detector 144 evaluates the decoded symbol from the current decoding cycle ($S_t$) and the decoded symbol from the previous decoding cycle ($S_{t-}$) stored in delay register 142. For the 2 Mbps mode, valid transition detector 144 evaluates the decoded symbols in accordance with the following algorithm:

IF $S_{t-1}$='00' AND $S_t$='10' THEN ADD (ZC VALUE)
ELSE IF $S_{t-1}$='10' AND $S_t$='00' THEN SUBTRACT (ZC VALUE)
ELSE IF $S_{t-1}$='11' AND $S_t$='01' THEN SUBTRACT (ZC VALUE)
ELSE IF $S_{t-1}$='01' AND $S_t$='11' THEN ADD (ZC VALUE)
ELSE DO NOTHING

For the 1 Mbps mode, valid transition detector 144 evaluates the decoded symbols in accordance with a similar algorithm:

IF $S_{t-1}$='0' AND $S_t$='1' THEN ADD (ZC VALUE)
ELSE IF $S_{t-1}$='1' AND $S_t$='0' THEN SUBTRACT (ZC VALUE)
ELSE DO NOTHING

The foregoing algorithms will be explained in further detail below.

The output of filter 120 is also input to zero crossing detector circuit 180. Zero crossing detector circuit 180 samples the amplitude of the input waveform to obtain a respective input value ("zero crossing" (ZC) value), in response to the occurrence of a zero cross pulse. The zero cross pulse is spaced a generally constant number of reference clock pulses from the decode sample pulse. The ZC value may be ADDED to or SUBTRACTED from the value stored in register 162 of accumulator 160, and the result stored therein. The output of symbol evaluation circuit 140 is used to determine whether to ADD or SUBTRACT the ZC value, or alternatively do nothing with the ZC value. If nothing is done with the ZC value it is discarded. It should be appreciated that register 162 is initially preset to zero.

Each decoding cycle, the accumulated value (AV) stored in register 162 is compared to a "retard threshold value" ($T_R$) and an "advance threshold value" ($T_A$). In this regard, comparator 192 determines whether the accumulated value AV is greater than $T_R$. If so, comparator 192 outputs a "retard signal" (RET) to clock recovery circuit 200. This causes the clock recovery circuit 200 to generate the next decode sample pulse one reference clock pulse earlier. Comparator 194 determines whether the accumulated value AV is less than the $T_A$. If so, comparator 194 outputs an "advance signal" (ADV) to clock recovery circuit 200. This causes the clock recovery circuit 200 to generate the next decode sample pulse one reference clock pulse later.

Figure 4:
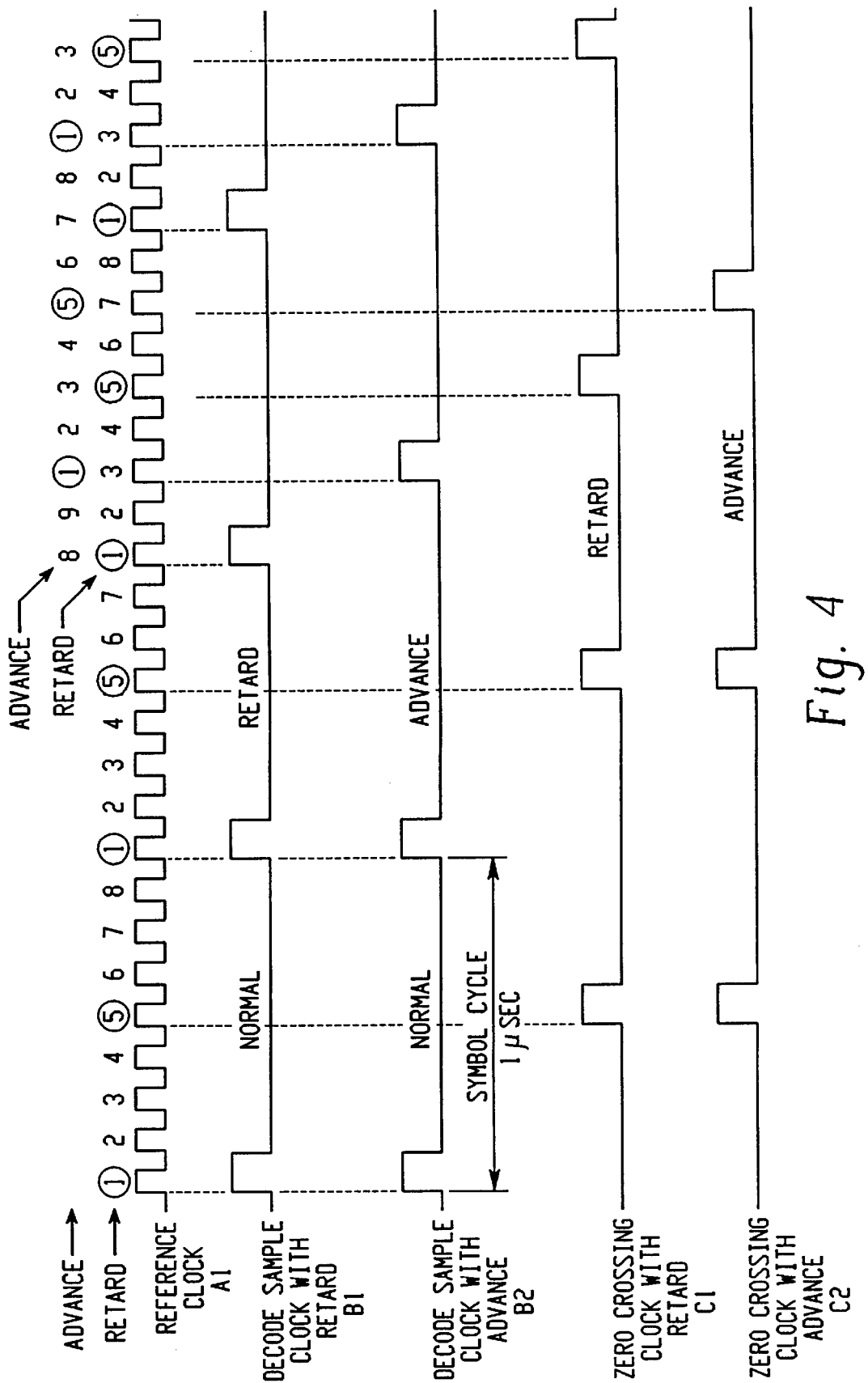
FIG. 4 is a timing diagram illustrating operation of the decoding system shown in FIG. 3.

Referring now to the timing diagram shown in FIG. 4, clock recovery circuit 200 receives reference clock pulses from an external clock circuit (not shown). In normal operation, 8 reference clock pulses define a symbol period (e.g., 1 μsec). In response to receiving a predetermined number of reference clock pulses (see timing line A1), clock recovery circuit 200 generates a decode sample pulse (see timing lines B1 and B2), which is output to slicer 130. Slicer 130 samples the input waveform in response to receipt of a decode sample pulse. As a result, slicer 130 decodes an input value into a symbol. Clock recovery circuit 200 may be configured to initially generate a decode sample pulse at the occurrence of every 8th reference clock pulse, which is labeled as "normal" in FIG. 4. Likewise, a zero crossing pulse may be spaced 4 reference clock pulses after the occurrence of a decode sample pulse (see timing lines C1 and C2). In the event that a retard signal RET is received from comparator 192, the decode sample pulse is generated one reference clock pulse earlier (i.e., pulse no. 8 is deleted from the symbol period). Thereafter, until another threshold is exceeded, a symbol period will have a length of 8 reference clock pulses, with a decode sample pulse at pulse no. 1 and a zero crossing pulse at pulse no. 5. Similarly, in the event that an advance signal ADV is received from comparator 194, the decode sample pulse is generated one reference clock pulse later (i.e., pulse no. 9 is added to the symbol period). Thereafter, until another threshold is exceeded, a symbol period will have 8 reference clock pulses, with a decode sample pulse at pulse no. 1 and a zero crossing pulse at pulse no. 5. It should be appreciated that the added or deleted reference clock pulse may occur between the occurrence of a decode sample pulse and a zero crossing pulse, or between the occurrence of a zero crossing pulse and a decode sample pulse.

The timing of the decode sample pulse may be altered by a plurality of reference clock pulses, depending upon the output received from comparators 192 and 194, which in turn will depend upon the accumulated values stored in register 162.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A decoding system for decoding a received input waveform including a plurality of encoded symbols, the decoding system comprising:

sampling means for sampling an input waveform for a plurality of sample cycles, wherein for each sample cycle a zero-crossing input value is obtained at a first sampling time and a sampled input value is obtained at a second sampling time;

decoding means for decoding each sampled input value into a decoded symbol;

symbol evaluation means for comparing the decoded symbol from a current sample cycle to the decoded symbol from a previous sample cycle;

means for determining an accumulated offset value, in accordance with the character of the transition between the decoded symbol from a current sample cycle to the decoded symbol from a previous sample cycle; and timing modification means for modifying one of said first and second sampling time of at least one sample cycle in response to said accumulated offset value exceeding at least one predetermined threshold value.

2. A decoding system according to claim 1, wherein said timing modification means includes a comparator means for comparing said accumulated offset value to a first predetermined threshold value and a second predetermined threshold value.

3. A decoding system according to claim 2, wherein said timing modification means retards one of said first and second sampling times of at least one sample cycle, in response to said accumulated offset value exceeding said first predetermined threshold value.

4. A decoding system according to claim 2, wherein said timing modification means advances one of said first and second sampling times of at least one sample cycle, in response to said accumulated offset value exceeding said second predetermined threshold value.

5. A decoding system for decoding a received input waveform including a plurality of encoded symbols, the decoding system comprising:

first sampling means for sampling an input waveform to obtain a zero-crossing input value;

second sampling means for sampling said input waveform to obtain a sampled input value, said second sampling means sampling said input waveform in accordance with a decode sample pulse;

decoding means for decoding the sampled input value into a decoded symbol;

symbol evaluation means for comparing the decoded symbol to a previously decoded symbol;

accumulator means for accumulating the zero-crossing input value in in accordance with the character of the transition between the decoded symbol and the previously decoded symbol;

comparison means for comparing the accumulated zero-crossing input values with at least one threshold value, and outputting a timing modification signal in response to the accumulated zero-crossing input value exceeding the at least one threshold value; and clock recovery means for generating the decode sample pulse, wherein timing of the decode sample pulse is modifiable in accordance with said timing modification signal.

6. A decoding system according to claim 5, wherein said first sampling means includes a slicer.

7. A decoding system according to claim 5, wherein said second sampling means includes a zero crossing detector.

8. A decoding system according to claim 5, wherein said system further comprises an analog-to-digital converter for converting a received analog signal to the input waveform.

9. A decoding system according to claim 5, wherein said comparison means compares the accumulated zero-crossing input values with first and second threshold values, wherein said timing modification signal causes said clock recovery means to retard generation of the next generated decode sample pulse in response to the accumulated zero-crossing input value exceeding the first threshold value, and causes said clock recovery means to advance generation of the next generated decode sample pulse in response to the accumulated zero-crossing input value exceeding the second threshold value.

10. A method for decoding a received input waveform including a plurality of encoded symbols, the method comprising:

sampling an input waveform for a plurality of sample cycles, wherein for each sample cycle a zero-crossing input value is obtained at a first sampling time and a sampled input value is obtained at a second sampling time;

decoding each sampled input value into a decoded symbol;

comparing the decoded symbol from a current sample cycle to the decoded symbol from a previous sample cycle;

determining an accumulated offset value, in accordance with the character of the transition between the decoded symbol from a current sample cycle to the decoded symbol from a previous sample cycle; and modifying one of said first and second sampling times of at least one sample cycle in response to said accumulated offset value exceeding at least one predetermined threshold value.

11. A method according to claim 10, wherein said step of modifying includes comparing said accumulated offset value to a first predetermined threshold value and a second predetermined threshold value.

12. A method according to claim 11, wherein said step of modifying includes retarding one of said first and second sampling times of at least one sample cycle, in response to said accumulated offset value exceeding said first predetermined threshold value.

13. A method according to claim 11, wherein said step of modifying includes advancing one of said first and second sampling times of at least one sample cycle, in response to said accumulated offset value exceeding said second predetermined threshold value.

14. A method for decoding a received input waveform including a plurality of encoded symbols, the method comprising:

sampling an input waveform in accordance with a zero crossing pulse to obtain a zero-crossing input value;

sampling said input waveform in accordance with a decode sample pulse to obtain a sampled input value;

decoding the sampled input value into a decoded symbol;

comparing the decoded symbol to a previously decoded symbol;

accumulating the zero-crossing input value in accordance with the character of the transition between the decoded symbol and the previously decoded symbol;

comparing the accumulated zero-crossing input values with at least one threshold value, and outputting a timing modification signal in response to the accumulated zero-crossing input value exceeding the at least one threshold value; and generating the decode sample pulse, wherein timing of the decode sample pulse is modifiable in accordance with said timing modification signal.

15. A method according to claim 14, wherein said method includes the step of converting a received analog signal to the input waveform.

16. A method according to claim 14, wherein said step of comparing includes comparing the accumulated zero-crossing input values with first and second threshold values, wherein said timing modification signal causes said clock recovery means to retard the generation of the next generated decode sample pulse in response to the accumulated zero-crossing input value exceeding the first threshold value, and causes said clock recovery means to advance the generation of the next generated decode sample pulse in response to the accumulated zero-crossing input value exceeding the second threshold value.

* * * * *